US009822725B2

(12) United States Patent
Hamamoto et al.

(10) Patent No.: US 9,822,725 B2
(45) Date of Patent: Nov. 21, 2017

(54) CONTROL DEVICE AND CONTROL METHOD OF ENGINE

(71) Applicants: Yoshiaki Hamamoto, Nisshin (JP); Daigo Ando, Nagoya (JP); Shuichi Yasutomi, Toyota (JP); Kengo Hamada, Yokkaichi (JP)

(72) Inventors: Yoshiaki Hamamoto, Nisshin (JP); Daigo Ando, Nagoya (JP); Shuichi Yasutomi, Toyota (JP); Kengo Hamada, Yokkaichi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/429,013

(22) PCT Filed: Dec. 17, 2013

(86) PCT No.: PCT/IB2013/002784
§ 371 (c)(1),
(2) Date: Mar. 18, 2015

(87) PCT Pub. No.: WO2014/096927
PCT Pub. Date: Jun. 26, 2014

(65) Prior Publication Data
US 2015/0247471 A1 Sep. 3, 2015

(30) Foreign Application Priority Data
Dec. 21, 2012 (JP) ................................. 2012-279584

(51) Int. Cl.
*F02D 41/24* (2006.01)
*F02D 41/00* (2006.01)
*F02D 41/16* (2006.01)

(52) U.S. Cl.
CPC ..... *F02D 41/2451* (2013.01); *F02D 41/0002* (2013.01); *F02D 41/2464* (2013.01);
(Continued)

(58) Field of Classification Search
CPC ...... F02D 41/00; F02D 41/0002; F02D 41/24; F02D 41/2451; F02D 41/2464;
(Continued)

(56) References Cited

U.S. PATENT DOCUMENTS 5,213,078 A * 5/1993 Kolberg ................ F02D 11/106
123/399
6,062,198 A * 5/2000 Loehr .................... F02D 41/061
123/399

(Continued)

FOREIGN PATENT DOCUMENTS

CN 101270697 A 9/2008
JP 11-159387 6/1999
(Continued)

*Primary Examiner* — John Kwon
*Assistant Examiner* — Johnny H Hoang
(74) *Attorney, Agent, or Firm* — Finnegan, Henderson, Farabow, Garrett & Dunner, LLP

(57) ABSTRACT

A control device of an engine includes an adjustment mechanism and a controller. The adjustment mechanism is configured to adjust an intake air amount. The controller is configured to save a first learning value in a volatile storage medium, the first learning value being obtained by learning an operation amount of the adjustment mechanism when the engine is idle. The controller is configured to control the adjustment mechanism according to the first learning value. The controller is configured to save a second learning value in a non-volatile storage medium, the second learning value being equal to the first learning value. The controller is configured to correct the first learning value using the second learning value after the first learning value is cleared.

8 Claims, 4 Drawing Sheets

(52) U.S. Cl.
CPC .......... *F02D 41/2493* (2013.01); *F02D 41/16* (2013.01); *Y02T 10/42* (2013.01)

(58) Field of Classification Search
CPC .. F02D 41/2493; F02D 41/16; F02D 2200/04; F02D 2200/0404; Y02T 10/42
USPC .................. 701/102, 103, 106, 114, 115; 123/339.23, 339.24, 674, 681, 684
See application file for complete search history.

(56) References Cited

U.S. PATENT DOCUMENTS

| | | | | |
|---|---|---|---|---|
| 6,612,287 | B2* | 9/2003 | Pursifull | F02D 11/105 |
| | | | | 123/396 |
| 6,895,929 | B2* | 5/2005 | Grossmann | F02D 9/02 |
| | | | | 123/361 |
| 2004/0204800 | A1 | 10/2004 | Honda | |
| 2006/0090728 | A1* | 5/2006 | Arinaga | F02D 13/0207 |
| | | | | 123/339.19 |
| 2006/0174854 | A1* | 8/2006 | Yoshizawa | F01L 13/0021 |
| | | | | 123/348 |
| 2008/0053403 | A1 | 3/2008 | Bauerle et al. | |
| 2009/0043477 | A1* | 2/2009 | Oi | F02D 9/02 |
| | | | | 701/103 |

FOREIGN PATENT DOCUMENTS

| | | |
|---|---|---|
| JP | 2001-82225 | 3/2001 |
| JP | 2002-285893 | 10/2002 |
| JP | 2003-27992 | 1/2003 |
| JP | 2004-318267 | 11/2004 |
| JP | 2006-83734 | 3/2006 |
| JP | 2007-15421 | 1/2007 |
| JP | 2008-144607 | 6/2008 |
| JP | 2008-196441 | 8/2008 |
| JP | 2010-127212 | 6/2010 |
| JP | 2011-163262 | 8/2011 |
| JP | 2011-220113 | 11/2011 |
| JP | 2012-36803 | 2/2012 |
| WO | WO 2008/099276 A1 | 8/2008 |

* cited by examiner

_CONTROL DEVICE AND CONTROL METHOD OF ENGINE_

CROSS-REFERENCE TO RELATED APPLICATIONS

This application is a national phase application of International Application No. PCT/IB2013/002784, filed Dec. 17, 2013, and claims the priority of Japanese Application No. 2012-279584, filed Dec. 21, 2012, the content of both of which is incorporated herein by reference.

BACKGROUND OF THE INVENTION

1. Field of the Invention

The present invention relates to a control device and a control method of an engine.

2. Description of Related Art

It is known that the intake air amount of an engine, mounted on a vehicle, is adjusted by the throttle valve. Continued use of an engine may form a deposit on the throttle valve, sometimes resulting in a decrease in the intake air amount even when the throttle angle remains the same. Meanwhile, technology has been developed to correct the throttle angle according to the number of engine stalls or the engine speed and to store the resulting learning value for preventing permanent performance degradation.

The stored learning value may be cleared to the initial value, when the battery is removed or replaced for vehicle maintenance. In this case, if the throttle valve is replaced or cleaned, a desired air amount can be obtained sufficiently; however, if a deposit is remains formed on the throttle valve, the air intake amount will be insufficient.

As one of the methods to avoid the insufficiency of the intake air amount, Japanese Patent Application Publication No. 2010-127212 (JP 2010-127212 A) discloses a method. According to this method, if the learning value is cleared, the throttle valve is controlled so that the insufficiency of the intake air amount can be avoided when the engine is started later.

SUMMARY OF THE INVENTION

An increase in the throttle angle could avoid a stall but may result in an excessive engine speed.

The present invention provides a control device and a control method of an engine that can maintain a proper intake air amount even after the learning value is cleared.

According to a first aspect of the present invention, a control device of an engine includes an adjustment mechanism and a controller. The adjustment mechanism is configured to adjust an intake air amount. The controller is configured to save a first learning value in a volatile storage medium. The first learning value is obtained by learning an operation amount of the adjustment mechanism when the engine is idle. The controller is configured to control the adjustment mechanism according to the first learning value. The controller is configured to save a second learning value in a non-volatile storage medium. The second learning value is equal to the first learning value. The controller is configured to correct the first learning value using the second learning value after the learning value saved in the volatile storage medium is cleared.

The second learning value stored in the non-volatile storage medium is not cleared even when the battery is removed and the power supply is stopped. Therefore, even when the first learning value stored in the volatile storage medium is cleared, the second learning value stored in the non-volatile storage medium can be used to operate the adjustment mechanism based on the operation amount obtained from the result of learning. Thus, the above configuration ensures an appropriate intake air amount even after the learning value is cleared.

In the control device, the controller may be configured to stop updating of the second learning value after the first learning value is cleared. This allows the second learning value in the non-volatile storage medium to be maintained at the value before the first learning value in the volatile storage medium is cleared.

In the control device, the controller may be configured to correct, the first learning value if, after the first learning value is cleared, the operation amount of the adjustment mechanism is an operation amount corresponding to an initial value of the first learning value and an output torque of the engine is smaller than a predetermined value. This allows the adjustment mechanism to be controlled suitably using the second learning value, obtained from the learning result, if the adjustment mechanism cannot be controlled properly by the first learning value that is initialized to the initial value.

In the control device, the controller may be configured to correct the first learning value if, after the first learning value is cleared, the operation amount of the adjustment mechanism is an operation amount corresponding to an initial value of the first learning value and the engine is not be started. This allows the adjustment mechanism to be controlled suitably using the second learning value, obtained from the learning result, if the adjustment mechanism cannot be controlled properly by the first learning value that is initialized to the initial value.

In the control device, the controller may be configured to correct the first learning value by adding a difference between the second learning value and the first learning value to the first learning value. This allows the cleared learning value to be returned to the first learning value before it is cleared.

According to a second aspect of the present invention, a control method of an engine including an intake air amount adjustment mechanism, the control method includes: saving a first learning value in a volatile storage medium, the first learning value being obtained by learning an operation amount of the adjustment mechanism when the engine is idle; controlling the adjustment mechanism according to the first learning value; saving a second learning value in a non-volatile storage medium, the second learning value being equal to the first learning value; and correcting the first learning value using the second learning value after the first learning value is cleared.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
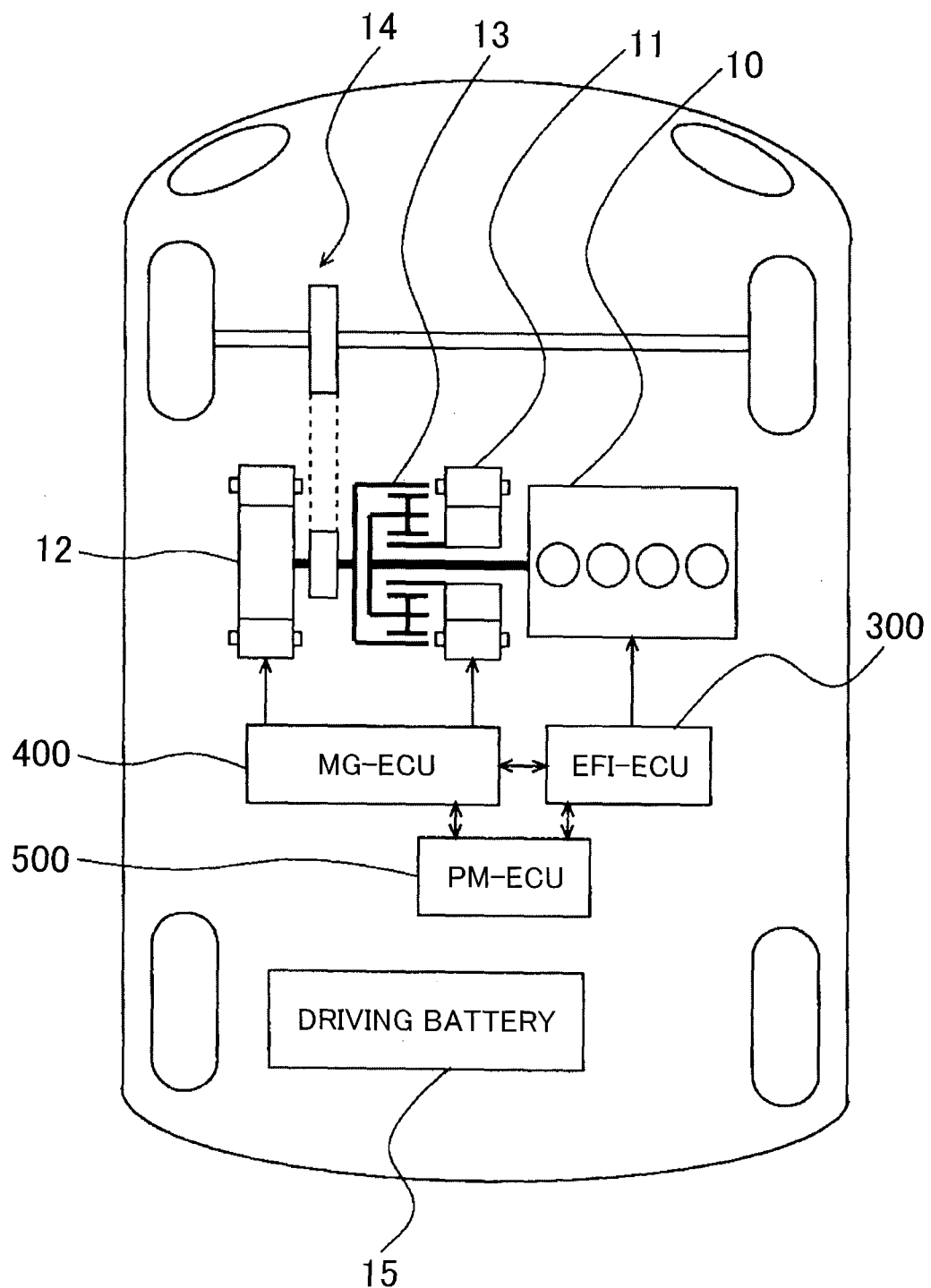
FIG. 1 is a general diagram showing a vehicle in an exemplary embodiment of the present invention.

An exemplary, embodiment of the present invention is described below with reference to the drawings. In the description below, the like reference numeral is given to the like component. The components having the like reference numeral have the like name and the like function and, therefore, the repetitive description will not be given.

Referring to FIG. 1, a vehicle includes an engine 10, a first motor generator 11, a second motor generator 12, a power split mechanism 13, a reduction gear 14, and a driving battery 15. The power train of this vehicle includes the engine 10, the first motor generator 11, and the second motor generator 12.

The vehicle travels by the driving force from at least one of the engine 10 and the second motor generator 12.

The engine 10, first motor generator 11, and second motor generator 12 are connected via the power split mechanism 13. The motive power generated by the engine 10 is divided into two paths by the power split mechanism 13. One is a path for driving the wheels via the reduction gear 14. The other is a path for generating electric power by driving the first motor generator 11.

The first motor generator 11 is a three-phase AC rotary electric machine that includes a U-phase coil, a V-phase coil, and a W-phase coil. The first motor generator 11 generates electricity by the motive power of the engine 10 divided by the power split mechanism 13. The electric power generated by the first motor generator 11 is used for different purposes depending on the traveling state of the vehicle or the State Of Charge (SOC) of the driving battery 15. For example, when the vehicle is traveling in the usual state, the electric power generated by the first motor generator 11 is used directly as the electric power for driving the second motor generator 12. On the other hand, when the SOC of the driving battery 15 is lower than a predetermined value, the electric power generated by the first motor generator 11 is stored in the driving battery 15.

When starting the engine 10, the first motor generator 11 functions as a motor and cranks the engine 10. During cranking, the first motor generator 11 generates a torque to increase the engine speed.

The second motor generator 12 is a three-phase AC rotary electric machine that includes a U-phase coil, a V-phase coil, and a W-phase coil. The second motor generator 12 is driven by at least one of the electric power stored in the driving battery 15 and the electric power generated by the first motor generator 11.

The driving force of the second motor generator 12 is transmitted to the wheels via the reduction gear 14. In this manner, the second motor generator 12 assists the engine 10 in driving the vehicle or drives the vehicle by the driving force obtained from the second motor generator 12 itself.

During the regenerative braking of the vehicle, the second motor generator 12, which is driven by the wheels via the reduction gear 14, operates as a generator. This allows the second motor generator 12 to operate as a regenerative brake that converts braking energy to electric power. The electric power generated by the second motor generator 12 is stored in the driving battery 15.

The power split mechanism 13 is composed of a planetary gear that includes a sun gear, a pinion gear, a carrier, and a ring gear. The pinion gear is engaged with the sun gear and the ring gear. The carrier supports the pinion gear so that it can rotate on its axis. The sun gear is coupled to the rotation axis of the first motor generator 11. The carrier is coupled to the crankshaft of the engine 10. The ring gear is coupled to the rotation axis of the second motor generator 12 and to the reduction gear 14.

Figure 2:
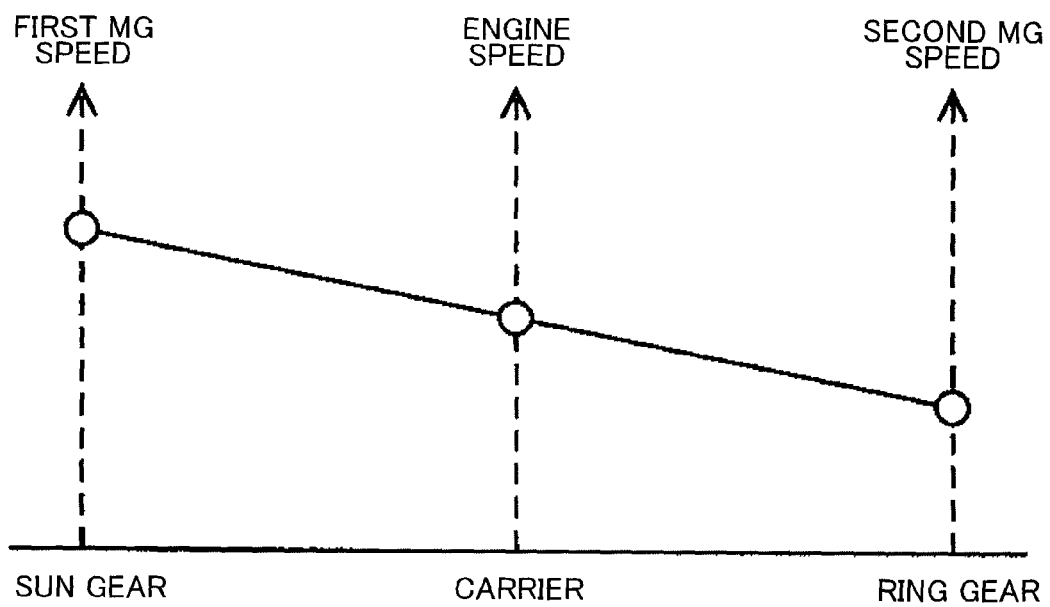
FIG. 2 is a collinear diagram showing the relation among the number of rotations established by a power split mechanism in the exemplary embodiment.

The engine 10, first motor generator 11, and second motor generator 12 are coupled via the power split mechanism 13 composed of the planetary gear. This configuration establishes the relation of the number of rotations among the engine 10, first motor generator 11, and second motor generator 12 as shown by the straight line in the collinear diagram in FIG. 2.

Returning to FIG. 1, the driving battery 15 is a battery pack composed of a plurality of cells. The driving battery 15 is composed of battery modules in each of which a plurality of cells are integrated. A plurality of battery modules are connected in series. An example of the driving battery 15 is a lithium ion battery. The voltage of the fully charged driving battery 15 is about 200V.

In this exemplary embodiment, the engine 10 is controlled by an electronic fuel injection (EFI)-electronic control unit (ECU) 300. The first motor generator 11 and the second motor generator 12 are controlled by a motor generator (MG)-ECU 400. The EFI-ECU 300 and the MG-ECU 400 are connected to a powertrain manager (PM)-ECU 500 in such a way that two-way communication is possible.

The PM-ECU 500 outputs a command signal to the EFI-ECU 300 about the target output and the target torque of the engine 10. The PM-ECU 500 also outputs a command signal to the MG-ECU 400 about the generation power of the first motor generator 11 and the driving power of the second motor generator 12. This means that the PM-ECU 500 regarded as a controller that integrally controls the power train of the vehicle.

Figure 3:
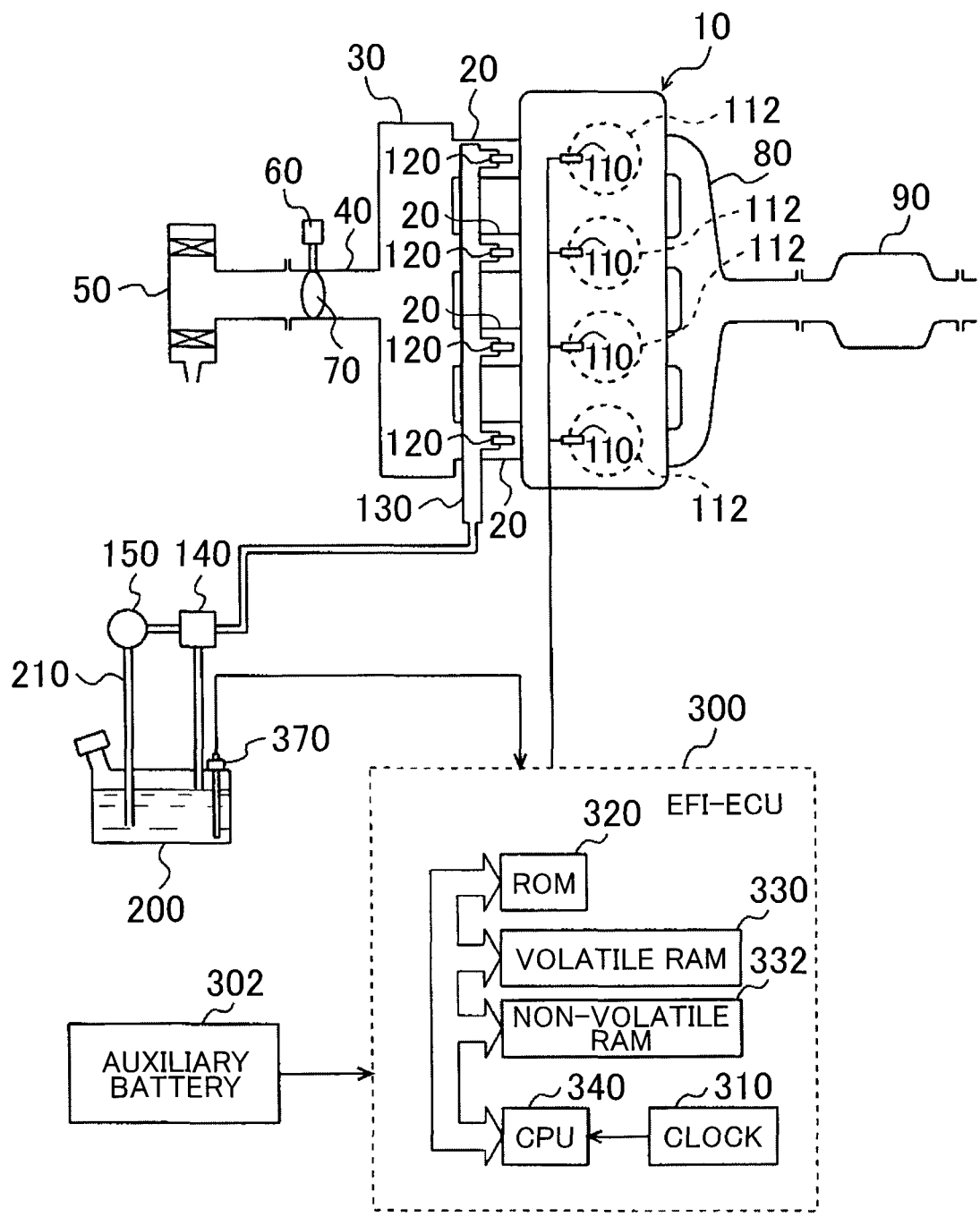
FIG. 3 is a general diagram showing an engine in the exemplary embodiment.

Referring to FIG. 3, the following describes the engine 10 more in detail. Although FIG. 3 shows an inline four-cylinder gasoline engine, as the engine 10, the present invention is not limited to such an engine this but is applicable to various types of engines such as a V6 engine or a V8 engine.

The engine 10 is an internal combustion engine. As shown in FIG. 3, the engine 10 includes four cylinders 112. Each cylinder 112 is connected to a common surge tank 30 via a corresponding intake manifold 20. The surge tank 30 is connected to an air cleaner 50 via an air intake duct 40.

A throttle valve 70, driven by an electric motor 60, is provided in the air intake duct 40. The throttle valve 70 is controlled so that the throttle angle TA is changed according to a change in the accelerator position. When the engine 10 is idle, the throttle angle is controlled by the idle speed control (ISC) so that the engine speed becomes equal to the target idling speed. The idle-time throttle angle TAISC is corrected according to the driving condition of the engine.

For example, if the idle-time engine speed is lower than a threshold NE1, the idle-time throttle angle TAISC is corrected so that it is increased by a predetermined value. Conversely, if the idle-time engine speed is higher than a threshold NE2, the idle-time throttle angle TAISC is corrected so that it is decreased by a predetermined value.

When the predetermined learning condition is satisfied, a first learning value EQG of the idle-time throttle angle TAISC, or the intake airflow rate learning value, is calculated. For example, if the idle-time throttle angle TAISC becomes higher than a threshold TAISC1, the first learning value EQG is increased by a predetermine value. Conversely, if the idle-time throttle angle TAISC becomes lower than a threshold TAISC2, the first learning value EQG is decreased by a predetermine value. The first learning value EQG is calculated in this manner. The method for correcting the idle-time throttle angle TAISC and the method for calculating the first learning value EQG are not limited to those described above.

Each cylinder 112 is coupled to a common exhaust manifold 80, which is coupled to a three-way catalyst converter 90. For each cylinder 112, a spark plug 110 and an injector 120, which injects fuel into the intake port and/or the intake passage, are provided. The spark plug 110 and the injector 120 are controlled based on the output signal from the electronic fuel injection (EFI)-ECU 300.

Each injector 120 is connected to a delivery pipe 130, which is connected to an electric-motor-driven fuel pump 150 via a fuel pressure regulator 140. The fuel pressure regulator 140 is configured to return a part of the fuel, discharged from the fuel pump 150, to a fuel tank 200 if the fuel pressure of the fuel, discharged from the fuel pump 150, becomes higher than a predetermined fuel pressure setting. This configuration therefore prevents the pressure of the fuel, supplied to the injector 120, from becoming higher than the fuel pressure setting.

A pipe 210, connected to the fuel pump 150, is inserted in the fuel tank 200. The fuel pump 150 sucks the fuel, stored in the fuel tank 200, via the pipe 210. The larger the number of rotations of the fuel pump 150 is, the larger the fuel suction amount of the fuel becomes.

The EFI-ECU 300, configured by a digital computer, includes a clock 310, a read-only memory (ROM) 320, a volatile random access memory (RAM) 330, a non-volatile RAM 332, and a central processing unit (CPU) 340.

The ROM 320 stores a program executed by the EFI-ECU 300. The volatile RAM 330 stores, for example, the first learning value EQG of the idle-time throttle angle TAISC. The non-volatile RAM 332 stores, for example, a second learning value EQGDEP that is updated to a value equal to the first learning value EQG. Unless inhibited, the second learning value EQGDEP is updated at a regular interval so that its value becomes equal to the first learning value EQG.

The CPU 340 executes the program stored in the ROM 320 and, using the values stored in the RAM 330 and the RAM 332, controls the throttle angle TA and the fuel injection amount.

In this exemplary embodiment, the EFI-ECU 300 is powered by an auxiliary battery 302. Therefore, when the auxiliary battery 302 is removed for repairing the vehicle, the first learning value EQG, stored in the volatile RAM 330, is cleared to the initial value. That is, the first learning value EQG is reset in such a case. On the other hand, the second learning value EQGDEP stored in the non-volatile RAM 332 is not cleared.

If the throttle valve 70 is replaced or cleaned when the first learning value EQG is cleared and, as a result, no deposit is formed on the throttle valve 70, the intake air amount of the engine 10 may be suitable.

In contrast, if the throttle valve 70 is neither replaced nor cleaned when the first learning value EQG is cleared and a deposit remains formed on the throttle valve 70, the first learning value EQG, is returned to the initial value. This may results in the insufficient intake air amount of the engine 10. In this exemplary, embodiment, the second learning value EQGDEP, stored in the non-volatile RAM 332, is used to correct the first learning value EQG after it is cleared.

Figure 4:
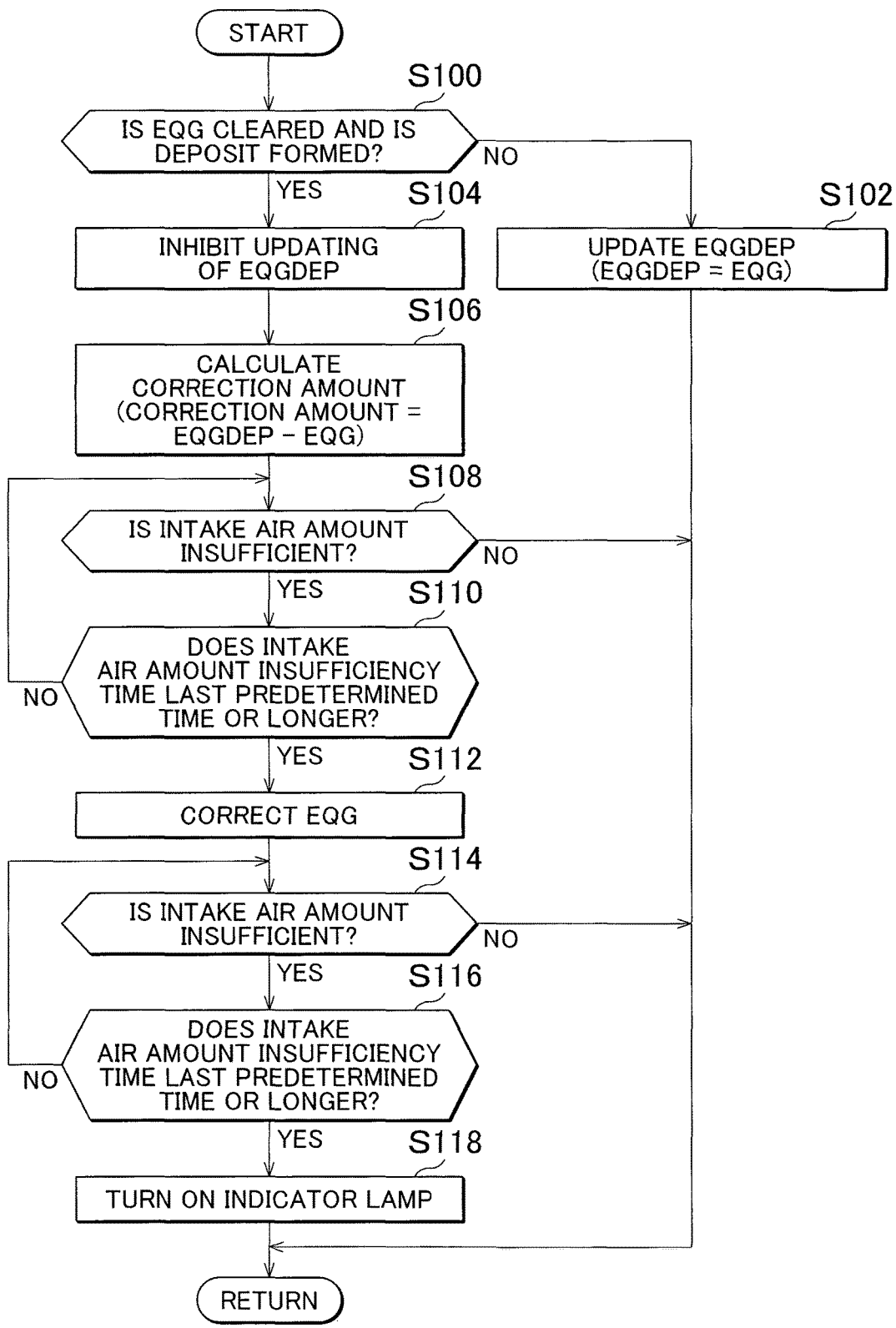
FIG. 4 is a flowchart showing the processing executed by an EFI-ECU in the exemplary embodiment.

Referring to FIG. 4, the following describes the processing executed by the EFI-ECU 300. Note that the processing described below is executed repeatedly at a predetermined interval. Also note that the processing described below is executed after the engine 10 is started.

In step 100 (hereinafter, step is abbreviated S), the EFI-ECU 300 determines whether the first learning value. EQG is cleared and whether a deposit is formed on the throttle valve 70 before the first learning value. EQG is cleared. For example, it is determined that the first learning value EQG is cleared and that a deposit is formed on the throttle valve 70 before the first learning value EQG, is cleared if the following four are satisfied: (1) the second learning value EQGDEP is larger than the initial value of the first learning value EQG, (2) the first learning value EQG is equal to or larger than the initial value of the first learning value EQG, (3) the learning of the throttle angle TAISC is not completed, and (4) the amount of the residual fuel is a predetermined value or larger. It is determined that the learning of the throttle angle TAISC is completed if the first learning value EQG is not changed for a predetermined time or longer.

If the first learning value EQG is not cleared (NO in S100) or if the first learning value EQG is cleared but a deposit is not formed' on the throttle valve 70 before the first learning value EQG is cleared (NO in S100), the second learning value EQGDEP is updated to the value equal to the first learning value EQG in S102.

On the other hand, if the first learning value EQG is cleared and a deposit is formed on the throttle valve 70 before the first learning value EQG is cleared (YES in S100), the update of the second learning value EQGDEP is inhibited in S104. After that, the correction amount of the first learning value EQG is calculated in S106. For example, the correction amount of the first learning value EQG is the difference between the second learning value EQGDEP and the first learning value EQG (second learning value EQGDEP−first learning value EQG).

After that, in S108, the EFI-ECU 300 determines whether the intake air amount of the engine 10 is insufficient. At this time, because the first learning value EQG is cleared, the throttle angle TAISC is a value corresponding to the initial value of the first learning value EQG. That is, in controlling the throttle valve 70, the throttle angle TAISC is determined based on the initial value of the first learning value EQG.

For example, if the torque of the first motor generator 11 is a positive value (engine speed is increased) or if the actual torque of the engine 10 is smaller than a predetermined value, it is determined that the intake air amount is insufficient. The torque of the first motor generator 11, if positive, indicates that the first motor generator 11 assists the engine 10 to maintain the engine speed of the engine 10 or to crank the engine 10 because the engine 10 cannot be started with the insufficient intake air amount. The actual torque of the engine 10 can be calculated from the throttle angle and the engine speed using the known technology.

If the intake air amount is insufficient (YES in S108) and, in addition, the intake air amount insufficiency time lasts a predetermine time or longer (YES in S110), the correction amount calculated in S106 as described above is added to the first learning value EQG in S112. The correction method of the first learning value EQG is not limited to this method. For example, the first learning value EQG may be corrected by increasing the value a predetermined amount at a time. If the intake air amount is insufficient, S108 and S110 are repeated until the intake air amount insufficiency time becomes a predetermined time or longer.

If the intake air amount is insufficient even after the first learning value EQG is corrected (YES in S114) and the intake air amount insufficiency time lasts a predetermined time or longer (YES in S116), it is considered that a malfunction of the engine 10 is occurred due to a factor other than a deposit. In this case, the malfunction indicator lamp (not shown) is turned on in S118. It is possible to use two different malfunction indicator lamps, one for a case in which the torque of the first motor generator 11 is positive and the other for a case in which the actual torque of the engine 10 is lower than a predetermined value. If a sufficient intake air amount is reserved in S108 and S114, the processing is once terminated.

The embodiments disclosed herein are to be considered merely illustrative and not restrictive in any respect. The scope of the present invention is defined not by the foregoing description but by the appended claims, and it is intended that the scope of the present invention include all modifications that fall within the meaning and scope equivalent to those of the appended claims.

The invention claimed is:

1. A control device for an engine, the control device comprising:
   an adjustment mechanism configured to adjust an intake air amount; and
   an ECU configured to
   (a) save a first learning value in a volatile storage medium, the first learning value being obtained by learning an operation amount of the adjustment mechanism when the engine is idle,
   (b) control the adjustment mechanism according to the first learning value,
   (c) save a second learning value in a non-volatile storage medium, the second learning value being equal to the first learning value, and
   (d) correct the first learning value using the second learning value after the first learning value is reset to an initial value,
   (e) wherein the ECU is configured to correct the first learning value using the second learning value after the first learning value is reset to the initial value and when:
      the operation amount of the adjustment mechanism is an operation amount corresponding to an initial value of the first learning value, and
      an output torque of the engine is smaller than a predetermined value, and
   wherein when a power supply of the ECU is stopped and the first learning value saved in the volatile storage medium is reset to the initial value, the ECU is configured to restore from the non-volatile memory, the second learning value being equal to the first learning value before being reset to the initial value.

2. The control device according to claim 1 wherein the ECU is configured to stop updating of the second learning value after the first learning value is reset to the initial value.

3. The control device according to claim 1 wherein the ECU is configured to correct the first learning value using the second learning value after the first learning value is reset to the initial value when:
   the operation amount of the adjustment mechanism is an operation amount corresponding to an initial value of the first learning value; and
   the engine fails to start.

4. The control device according to claim 1 wherein the ECU is configured to correct the first learning value by adding a difference between the second learning value and the first learning value to the first learning value.

5. A control method for an engine, the engine including an intake air amount adjustment mechanism, the engine being configured to be controlled using an ECU, the ECU including a volatile storage medium and a non-volatile storage medium, the control method comprising:
   (a) saving, by the ECU, a first learning value in the volatile storage medium, the first learning value being obtained by learning an operation amount of the adjustment mechanism when the engine is idle;
   (b) controlling, by the ECU, the adjustment mechanism according to the first learning value;
   (c) saving, by the ECU, a second learning value in the non-volatile storage medium, the second learning value being equal to the first learning value;
   (d) correcting, by the ECU, the first learning value using the second learning value after the first learning value is reset to an initial value,
   wherein correcting the first learning value using the second learning value after the first learning value is reset to the initial value includes correcting the first learning value using the second learning value after the first learning value is reset to the initial value and when:
      the operation amount of the adjustment mechanism is an operation amount corresponding to an initial value of the first learning value, and
      an output torque of the engine is smaller than a predetermined value; and
   (e) restoring, when a power supply of the ECU is stopped and the first learning value saved in the volatile storage medium is reset to the initial value, the second learning value from the non-volatile memory, the second learning value being equal to the first learning value before being reset to the initial value.

6. The control method according to claim 5 wherein updating of the second learning value is stopped, by the ECU, after the first learning value is reset to the initial value.

7. The control method according to claim 5 wherein the first learning value is corrected, by the ECU, using the second learning value after the first learning value is reset to the initial value and when:
   the operation amount of the adjustment mechanism is an operation amount corresponding to the initial value of the first learning value; and
   the engine fails to start.

8. The control method according to claim 5 wherein the first learning value is corrected by adding a difference between the second learning value and the first learning value to the first learning value by the ECU.

* * * * *